United States Patent [19]
Carey et al.

[11] Patent Number: 5,526,949
[45] Date of Patent: Jun. 18, 1996

[54] CONICAL THREAD BLENDER JAR

[75] Inventors: Mark R. Carey, Randolph Township, Montgomery County, Ohio; James S. Annis, Lincoln Township, Berrien County, Mich.; Edward L. Thies, Monroe Township, Miami County, Ohio

[73] Assignee: Whirlpool Corporation, Benton Harbor, Mich.

[21] Appl. No.: 126,604

[22] Filed: Sep. 27, 1993

[51] Int. Cl.⁶ .......................... B65D 23/00; B65D 23/10; B65D 41/04
[52] U.S. Cl. .................. 215/386; 215/44; 215/329; 366/205
[58] Field of Search .................. 215/1 R, 1 C, 215/100 R, 329, 40, 41, 44, 386; 220/568; 366/205, 315, 217

[56] References Cited

U.S. PATENT DOCUMENTS

| | | | |
|---|---|---|---|
| 422,967 | 3/1890 | Owens | 215/1 R |
| 1,054,833 | 3/1913 | Dutton | 220/568 |
| 2,036,407 | 4/1936 | Godfrey | 215/1 R |
| 2,669,468 | 2/1954 | Clerke | 215/329 X |
| 2,992,715 | 7/1961 | Blachly | 366/205 X |
| 3,002,642 | 10/1961 | Watson | 215/329 X |
| 3,297,187 | 1/1967 | Thiesen | 215/329 X |
| 3,504,816 | 4/1970 | Weichsel | 215/1 C |
| 3,784,118 | 1/1974 | Hurwitz | 366/205 X |
| 3,786,999 | 1/1974 | Cabell | 366/205 X |
| 4,798,303 | 1/1989 | Arnold | 215/329 |
| 4,885,917 | 12/1989 | Spector | 366/205 X |
| 4,887,909 | 12/1989 | Bennett | 366/205 X |
| 4,889,248 | 12/1989 | Bennett | 215/100 R |

FOREIGN PATENT DOCUMENTS

| | | | |
|---|---|---|---|
| 634913 | 1/1962 | Canada | 215/1 R |
| 2323561 | 11/1974 | Germany | 215/329 |

Primary Examiner—Sue A. Weaver
Attorney, Agent, or Firm—Hill, Steadman & Simpson

[57] ABSTRACT

A jar, preferably for a domestic blender, is provided with an external thread at a lower end for engaging with an internally threaded base member. The threads have a varying radial position along the axial length of the threaded area to assist in the assembly of the two parts and to prevent cross threading. In the disclosed embodiment, the jar has a frusto-conically shaped lower portion on which a constant height thread is formed. The base member has a cylindrical wall with a thread having a varying radial height to complement the position of the jar thread.

18 Claims, 3 Drawing Sheets

5,526,949

CONICAL THREAD BLENDER JAR

BACKGROUND OF THE INVENTION

The present invention relates to a jar and more particularly for a jar used with a kitchen blender.

Kitchen type blenders generally have a fixed base containing a motor with a drive shaft extending vertically therefrom. A jar is secured onto the fixed base for holding solid and/or liquid food items to be blended, liquified or chopped, etc. A blade assembly is mounted within the bottom portion of the jar for driving engagement with a motor shaft. In some cases the horizontal cross section of the jar is generally square with rounded corners and in other cases the horizontal cross section of the jar is circular.

The bottom of the jar has an external thread which mates with an internal thread on the base assembly. In some cases a separate member is threaded onto the bottom of the jar which is then received on a driving projection carried in the base member.

Generally the threaded base member and the threaded jar end are cylindrical and the thread on each part is uniform along its length thereby creating the potential for cross threading of the threads and requiring very accurate alignment of the two parts to assure proper assembly.

SUMMARY OF THE INVENTION

The present invention provides a thread configuration for a jar and its adjoining member which has particular utility with a blender jar and the blender base. The thread on the jar and the thread on the base have a varying radial position which greatly increases the ease of assembly and prevents any likelihood of cross threading of the threads. In the preferred arrangement the area adjacent the bottom of the jar has a frusto-conical shape such that the root of the thread has a varying diameter along the axial length of the jar. Moving downwardly, the thread on the base member has a varying or increasing radial dimension along the axial length in order to accommodate the decreasing diameter of the jar. Thus, the diameter of the engaging area of the threads at a lower end of the base and jar is smaller than the diameter of the engaging area at the upper part of the threaded portion of the base and jar. The jar, of course, could be maintained with a cylindrical configuration with the radial extent of the thread varying along the length of the threaded portion of the jar or, the interior shape of the base portion could be frusto-conical as well.

BRIEF DESCRIPTION OF THE DRAWINGS

FIG. 3 is a side sectional view of the blender jar.

FIG. 4 is a bottom elevational view of the blender jar.

FIG. 5 is a side sectional view of the base member.

DETAILED DESCRIPTION OF THE PREFERRED EMBODIMENTS

The present invention relates to the configuration of a jar at a portion having an external thread for engaging onto another member and could be utilized in any type of jar, but the invention does find particular utility in a jar used with a kitchen blender. Therefore, the preferred embodiment will be discussed within the environment of a kitchen blender.

Figure 1:
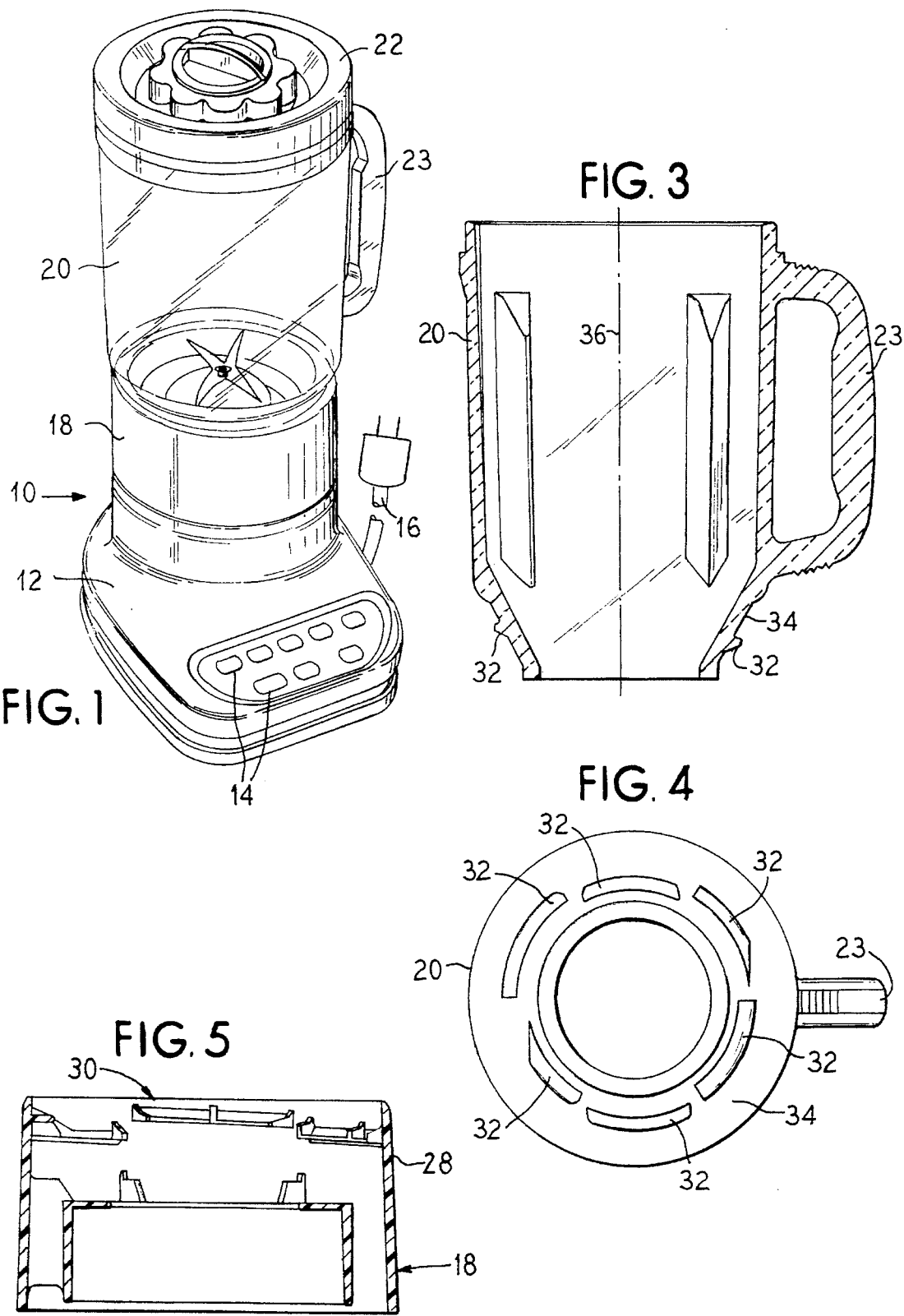
FIG. 1 is a perspective view of a food blender embodying the principles of the present invention.

FIG. 1 illustrates a domestic kitchen blender generally at 10 which is comprised of a base member 12 having a plurality of electrical controls 14 and an electric cord 16 for connecting to a source of electrical power. The base has an upstanding portion 18 to which is attached to a jar 20. In a preferred embodiment the jar 20 threadingly engages with the upstanding portion 18 of the base 12. The jar 20 is provided with a threaded lid 22 to close a top end of the jar. The jar 20 also has a radially projecting handle 23.

Figure 2:
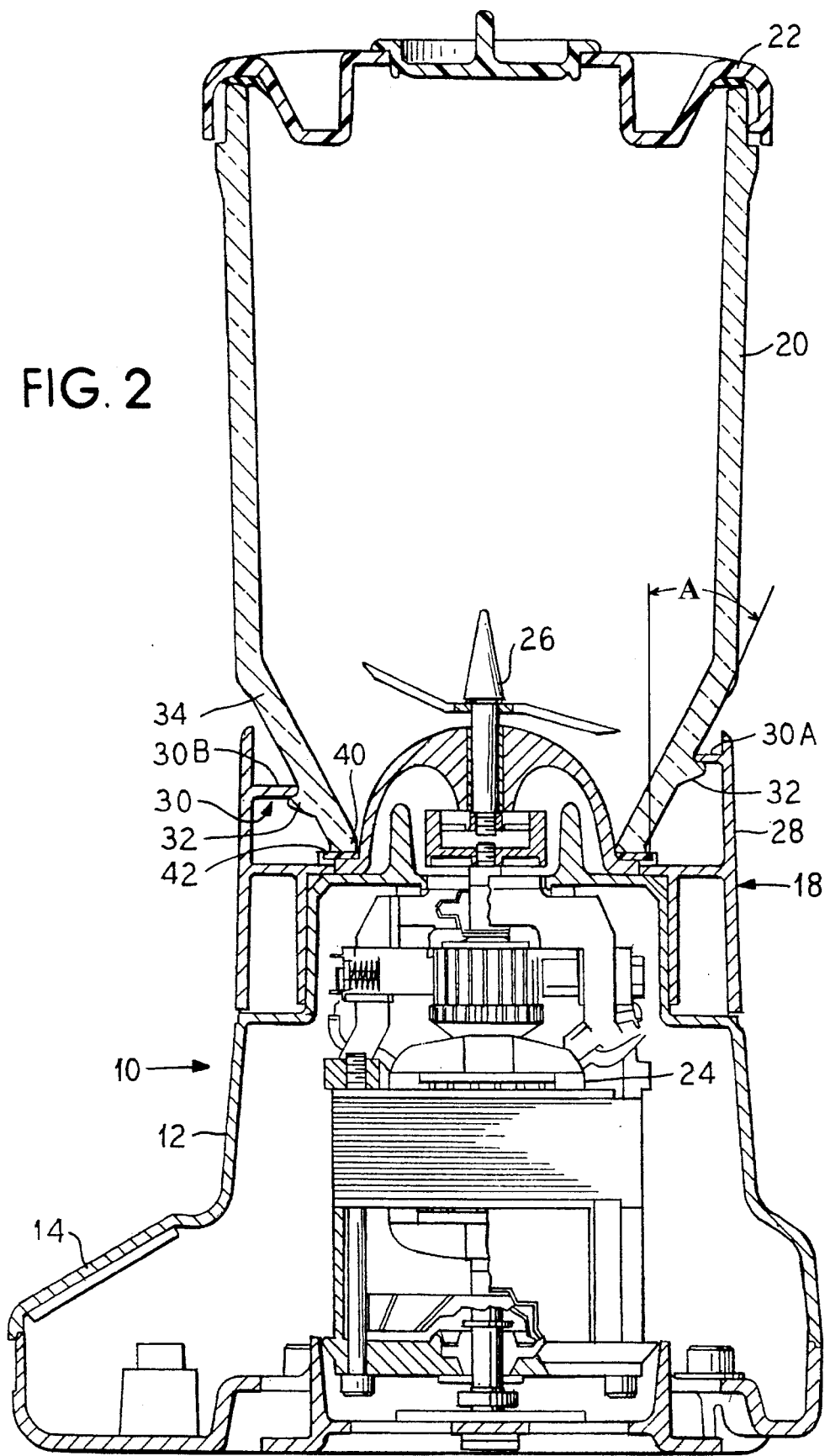
FIG. 2 is a side sectional view of the blender.

The internal components of the blender 10 are shown in greater detail in FIG. 2 where it is seen that the base 12 encloses an electric motor 24 which is used to rotatingly drive a blade 26 positioned within the blender jar 20. The upstanding portion 18 of the base 12 is a collar member which is separate from the base 12 and is slidingly received on the base. The base collar 18 has an essentially cylindrical outer wall 28 which is provided with an internal thread 30 to engage with an external thread 32 on the jar 20. As seen in FIGS. 2 and 3, a lower portion 34 of the jar 20 has a frusto-conical shape and the thread 32 carried thereon has a constant radial extent, the result being that the radial position of a lower portion of the thread is closer to an axis 36 of the jar than is an upper portion of the thread 32. As seen in FIG. 4, the thread 32 is actually formed as a series of spaced thread segments. The frusto-conical portion 34 is preferably tapered at an angle A of less than 45° from vertical, and most preferably at an angle of approximately 30°.

Figure 6:
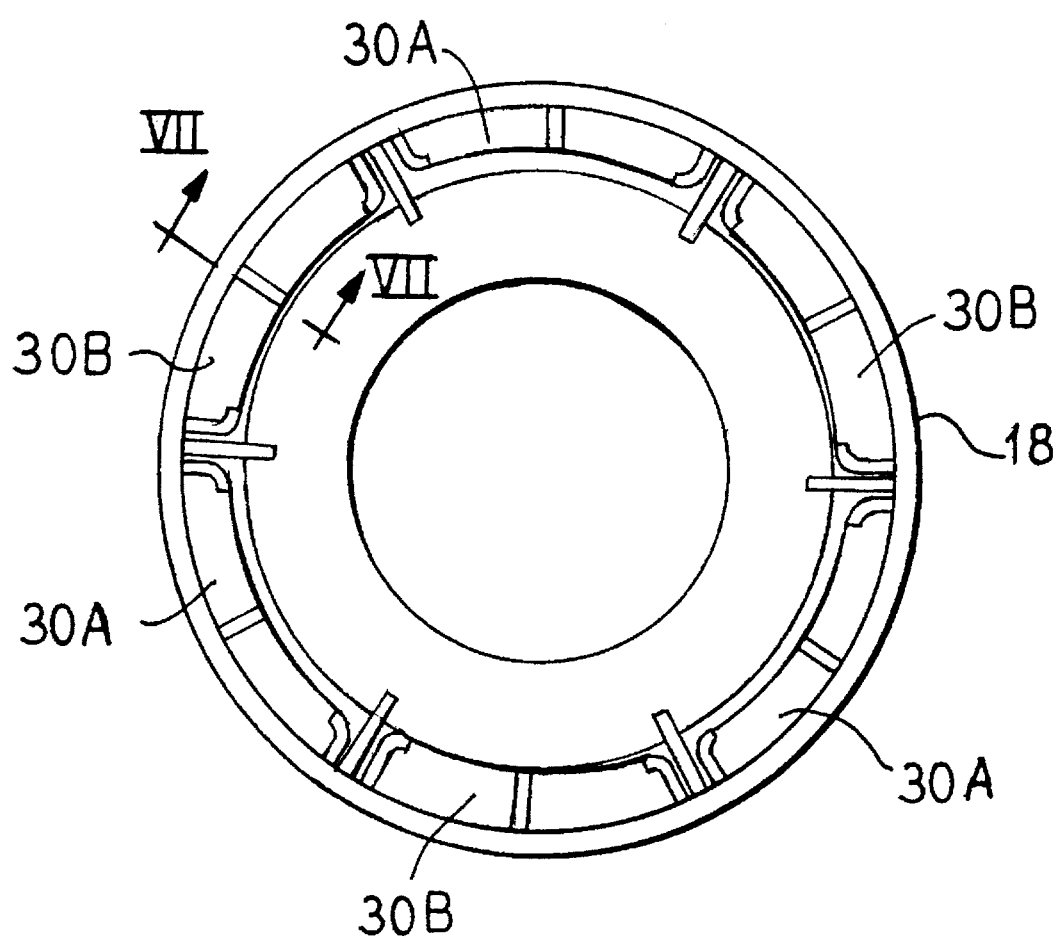
FIG. 6 is a plan view of the base member.
Figure 7:
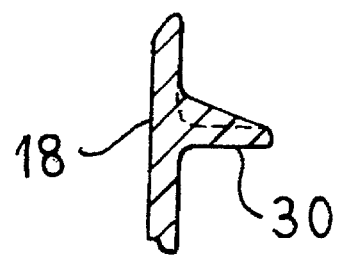
FIG. 7 is a side sectional view of a base member thread.

As best seen in FIGS. 2 and 6, the thread 30 carried on the collar 18 has a varying radial extent along the height of the collar 18 and is also formed as a series of thread segments. The upper thread segments 30A have a smaller radial extent than do the lower thread segments 30B. Thus, the threads 30, 32 are shaped complementarily and provide wedging engagement therebetween to cause a bottom end 40 of the jar 20 to sealingly engage against a seal 42 carried in the base collar 18.

The varying radial position of the engaging threads 30, 32 prevents cross threading between the jar 20 and the base collar 18 and requires less precise alignment between the jar and the collar during assembly.

It can be appreciated that although the jar 20 is shown as having a frusto-conical shape, it will be appreciated that the jar itself need not have the frusto-conical shape so long as the engaging portion of the thread 32 is presented at a varying radial position. Thus, the jar 20 could have a cylindrical shape with the radial extent of the thread varying as demonstrated by the varying radial extent of the thread 30 on the base collar 18. Also, the base collar 18 need not have a cylindrical wall 28 but could have a frusto-conical shaped wall with a constant height thread carried thereon to complement the radial position of the jar thread 32.

By providing thread segments rather than a continuous thread, entry into the thread is provided at a plurality of angular positions, rather than at a single angular position, again aiding in the ease of assembly.

As is, apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A jar for a blender comprising:

a liquid impervious vessel having a generally cylindrical wall with a first open end for receiving a lid, a second open end for being attached to a base member and a thread formed on an outer peripheral surface area adjacent to said second end for sealing engagement with an internal thread on said base member, said outer peripheral surface area adjacent to said second end having a frusto-conical shape, narrowest at said second end, said base member having a cylindrical wall with an open end for receiving said second end of said vessel, said base member wall having a constant radial dimension along its height, and carried on said base member wall is a helical thread which increases in its radial extent from said base member wall as said thread extends along at least a portion of the height of said base member away from said base member open end to complement said thread on said outer peripheral surface.

2. A jar according to claim 1, wherein said jar has a second thread formed on an outer peripheral surface area adjacent to said first end.

3. A jar according to claim 1, wherein said jar has a handle projecting radially from said outer peripheral surface area.

4. A jar according to claim 1, wherein said outer peripheral surface area is frusto-conically shaped only in an area adjacent to said second open end.

5. A jar according to claim 1, wherein said thread formed on said outer peripheral surface area comprises a series of spaced thread segments.

6. A jar according to claim 1, wherein said thread formed on said base member comprises a series of spaced thread segments.

7. A jar according to claim 1, wherein said frusto-conical shape comprises an angle from vertical of less than 45 degrees.

8. A jar for a blender comprising:

a liquid impervious vessel having a generally cylindrical wall with a first open end for receiving a lid, a second open end for being attached to a base member and a thread formed on an outer peripheral surface area adjacent to said second end for sealing engagement with an internal thread on said base member, said outer peripheral surface area adjacent to said second end having a frusto-conical shape, narrowest at said second end, wherein said frusto-conical shape comprises an angle from vertical of approximately 30 degrees.

9. A jar for a blender jar comprising:

a liquid impervious vessel having a generally cylindrical wall forming an open top end for receiving a lid and an open bottom end for being received by a base, said wall having a generally circular horizontal cross section throughout its height, a thread formed on a peripheral surface adjacent said open bottom end for engagement with an internal thread on said base;

mating surfaces on said thread formed on said peripheral surface and said internal thread having a complementary, but varying radial position along their lengths, said mating surfaces defining a frusto-conical shape tapering toward said bottom end and having an angle from vertical of approximately 30 degrees.

10. A jar according to claim 9, wherein said jar has a frusto-conical shape in an area adjacent to said bottom end providing said varying radial position for a root of said thread formed on said peripheral surface, and said thread is of a constant radial dimension along its length.

11. A jar according to claim 9, wherein said base has a wall having a constant radial dimension, and carried on said wall is said thread of varying radial extent.

12. A jar according to claim 9, wherein a lower portion of said thread on said base has a greater radial extent than a higher portion of said thread on said base.

13. A jar according to claim 9, wherein said thread formed on said peripheral surface comprises a series of spaced thread segments.

14. A jar according to claim 9, wherein said thread formed on said base comprises a series of spaced thread segments.

15. A jar according to claim 9, wherein said jar has a second thread formed on an outer peripheral surface area adjacent to said first end.

16. A jar according to claim 1, wherein said jar has a handle projecting radially from said outer peripheral surface.

17. A jar comprising a liquid impervious vessel having a generally cylindrical wall and an open end, a thread formed on an outer peripheral surface of said jar adjacent to said open end, said outer peripheral surface having a frusto-conical shape tapering toward said open end and defining an angle from vertical of approximately 30 degrees.

18. A jar according to claim 17, wherein said frusto-conical shape extends only in an area adjacent to said open end.

\* \* \* \* \*